Sept. 24, 1957 G. P. HERRICK 2,807,427
BAND BRAKE FOR CONVERTIPLANE
Filed May 14, 1953 2 Sheets-Sheet 1

INVENTOR,
GERARD P. HERRICK
BY Robert O. Wright

Sept. 24, 1957 G. P. HERRICK 2,807,427
BAND BRAKE FOR CONVERTIPLANE
Filed May 14, 1953 2 Sheets-Sheet 2
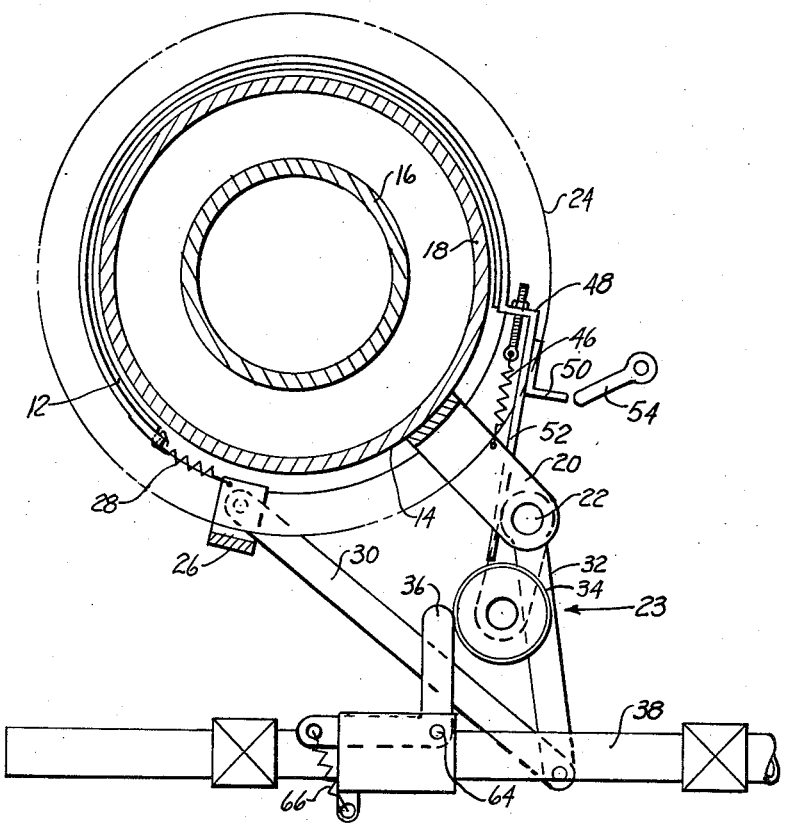
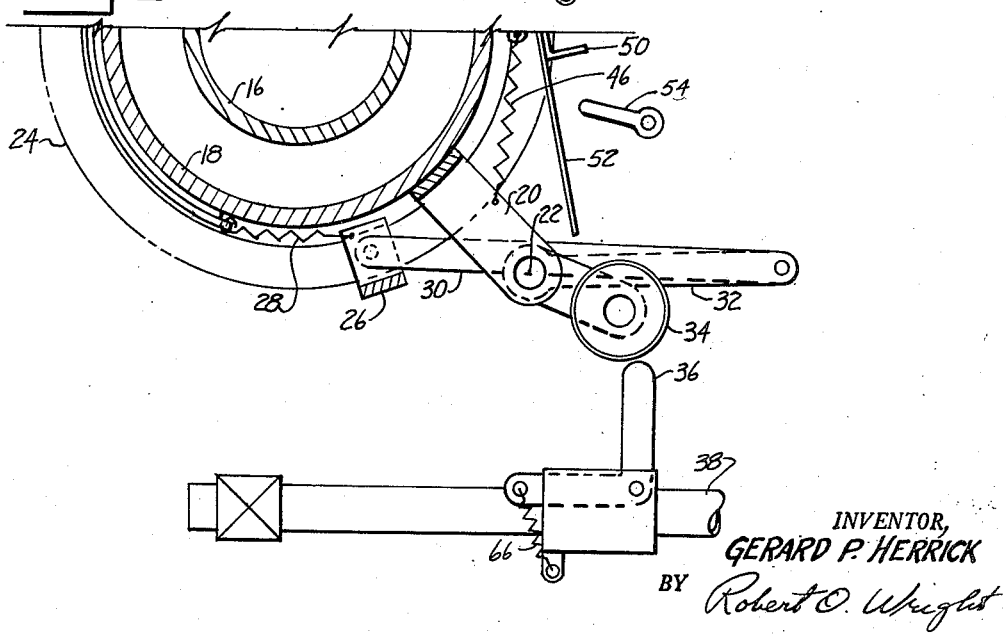
INVENTOR,
GERARD P. HERRICK
BY Robert O. Wright

United States Patent Office 2,807,427
Patented Sept. 24, 1957

2,807,427

BAND BRAKE FOR CONVERTIPLANE

Gerard P. Herrick, New York, N. Y., assignor, by mesne assignments, to Gerard Scott Herrick and Suzanne Herrick Cornell Application May 14, 1953, Serial No. 355,119

7 Claims. (Cl. 244—7)

This invention relates to braking means for stopping, reversing and orienting the lifting surface of aircraft of the type having a lifting surface convertible from rotating to fixed flight position and vice versa. More particularly this invention might be said to relate to a novel band brake mechanism for stopping the rotation of the rotary wing of aircraft of the convertiplane type and for automatically aiding in the reversing of the rotation thereof.

As described in my copending application, Serial No. 43,729, filed August 11, 1943 for Convertible Aircraft, now Patent No. 2,699,299, in aircraft of the convertiplane type, where it is desired to convert the aircraft from rotating wing to fixed wing flight, and vice versa, it is necessary that the lifting surface be stopped in the proper orientation relative to the motion of the aircraft to insure that the proper lifting will be obtained. As described in the above copending application, it has been found advantageous to first stop the rotation of the wing and then reverse the rotation through an angle from approximately 15 to 180° until a fixing mechanism is engaged which properly orients the lifting surface. It is thus desirable to have a braking mechanism that will initially oppose the rotation of the rotor wing and will then, after having stopped it, release it and aid it in starting reverse rotation.

According to the present invention there is provided independent means for rotating the rotor wing both in the forward and reverse directions, together with a novel braking means for stopping the rotation of the rotor wing, releasing it so it can rotate in the reverse direction and also aiding it in the starting of this rotation.

It is accordingly an object of the present invention to provide a braking mechanism that will stop the rotation of the rotor wing, automatically release upon the stopping and initial reverse rotation thereof, and that will also aid in the starting of the reverse rotation. It is another object of the present invention to provide an improved design that may be easily and readily actuated and released. It is another object of the present invention to provide a braking mechanism of a new and improved light weight construction that will provide a maximum of braking strength for a minimum of weight. It is a further object of the present invention to provide a novel band brake mechanism that once engaged will remain engaged until positively released. It is a further object of the present invention to provide a band brake construction that when once triggered will automatically release after having stopped the rotation of the rotor wing. It is a further object of the present invention to provide an actuating mechanism for a band brake construction that once engaged will tend to remain engaged, at least until the rotor wing stops rotating. It is a still further object of the present invention to provide an actuating mechanism and band brake structure that will aid in the release thereof after the rotor wing has stopped rotating, and starts reverse rotation. These and other and further objects will be in part apparent and in part pointed out as the specification proceeds.

In the drawings:

Figure 2 is a top plan view of the brake of Figure 1 showing the brake in the "off" or disengaged position.

Figure 3 is a view similar to Figure 2 showing the brake in the "on" or engaged position.

Figure 1:
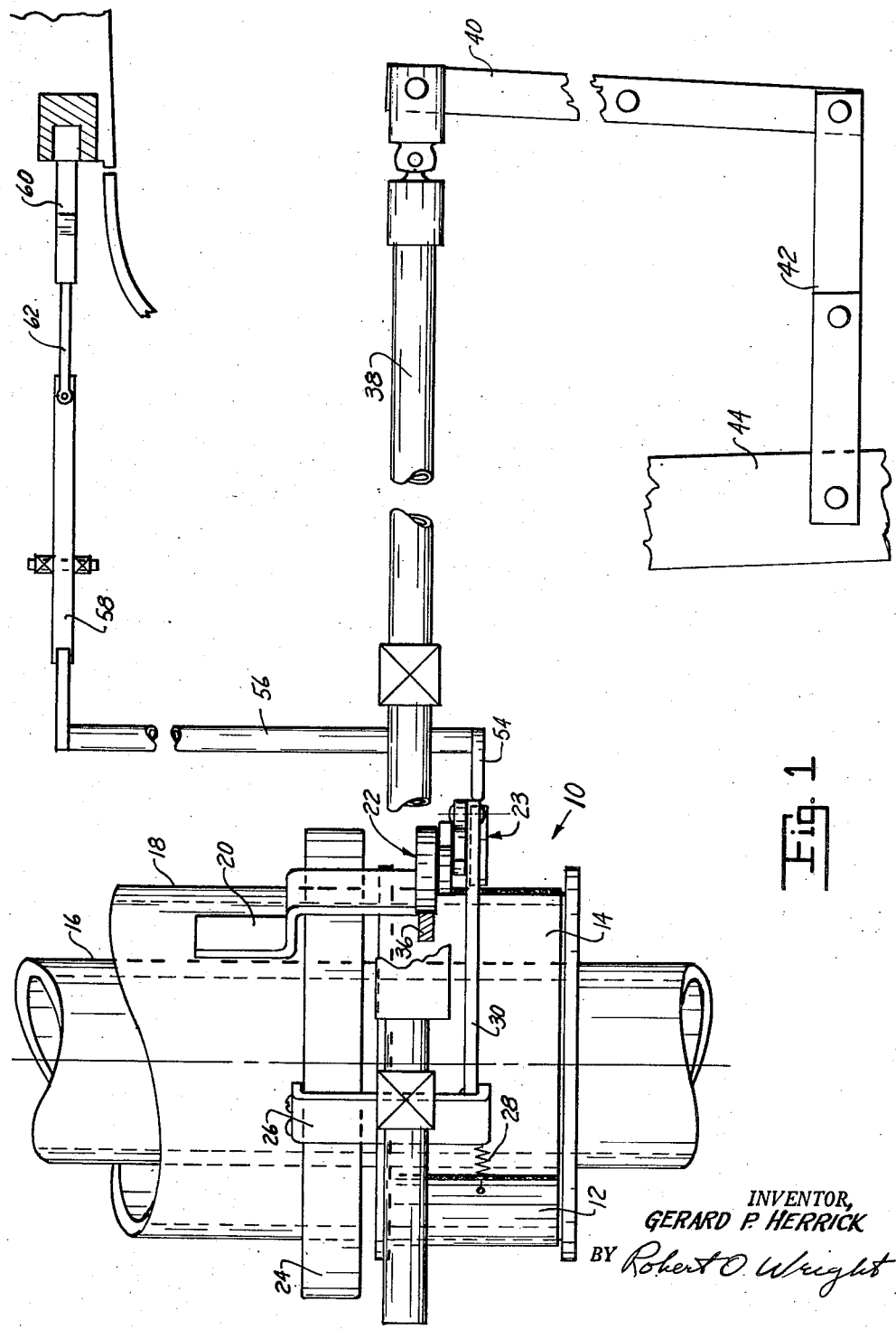
Figure 1 is a side elevation of a band brake according to the present invention.

Referring now to Figure 1, the brake mechanism 10 comprises brake band 12 loosely on the perimeter of the brake drum 14 which is operatively connected to the rotor wing mast 16. Surrounding mast 16 and fixed to the frame of the aircraft is a sleeve 18 which carries thereon a bracket 20 which provides a pivot point 22 for the brake actuating toggle mechanism 23. Rotatably mounted about the sleeve 18 is a yoke 24 which carries thereon a bracket 26, which is connected through spring 28 to the brake band 12. Bracket 26 is also pivotally connected to the link 30 of the toggle actuating mechanism 23. Link 30 is connected to one arm of the bell crank 32 which is pivoted at the center thereof about the pivot point 22 on bracket 20. The other end of bell crank 32 carries a cam roller 34 which is engaged by the actuating cam 36 of the conversion lever rod 38 which is actuated through the links 40 and 42 by the conversion lever 44 as described in detail in the above mentioned copending application.

The other end of the brake band 12 is connected through a bracket 48 and a spring 46 to the bracket 20 on the fixed sleeve 18. Bracket 48 also carries a pair of fingers 50 and 52 adapted to actuate the fixing mechanism and to release the brake toggle mechanism respectively.

Illustratively, when the convertiplane is in the rotary wing position of flight the conversion lever 44 and rod 38 are in the position shown in Figure 2 in which the brake mechanism is in the "off" position. When it is desired to engage the brake mechanism and to stop the rotor wing the conversion lever is moved to the conversion position which, through the link 38, causes cam finger 36 to engage the cam roll 34 on the end of the bell crank 32. This causes the toggle mechanism levers 30 and 32 to pivot about the point 22 on the bracket 20, from the position shown in Figure 2, into the position shown in Figure 3. This engages the brake band 12 with the brake drum 14 by tightening the brake band against the drum through the springs 28 and 46. As may be seen from Figure 3, after the toggle mechanism passes approximately the midpoint it is so designed that further tension on the springs 28 and 46 only serves to urge the brake toward the engaged position. Thus once the cam finger 36 has moved the brake into engagement it will no longer have to hold against the cam roller 34. Thus it may be moved past cam roller 34 as is shown in Figure 3. In this position of the cam lever 36 the toggle mechanism can be returned to its "off" position without moving the conversion lever.

The release of the band brake 10 is accomplished upon stopping of the rotor wing by a reversing motor connected to the mast, described in detail in my above mentioned copending application, together with the action of the spring 46. During the normal braking operation of the band brake 10, the spring 46 is placed under considerable tension as the brake band 12 resists the counter-clockwise rotation of the rotor wing shaft. Thus the bracket 48 is moved counter-clockwise (Figures 2 and 3) which carries the arms 50 and 52 back from the position shown in Figure 2 to that shown in Figure 3. Upon the stopping of the rotation of the rotor wing and the starting of the reverse rotation by the reversing motor, the spring 46 is allowed to return to its normal position which tends to move the bracket 48 and arms 50 and 52 back toward their normal position of Figure 2.

As the arm 52 moves back toward its position of Figure 2 to that of Figure 3, it pushes against the lever 30 until the lever passes its toggle point at which point spring 28 takes over and pulls the toggle back to its original position shown in Figure 2. This latter action is aided by the now clockwise rotation of the rotor wing mast and the inherent friction of the brake band 12 against the brake drum 14. The bracket 48 in addition to carrying the lever 52 carries a lever 50 which during this reverse movement engages arm 54 on the bottom of shaft 56 which in turn engages bell crank 58 at the upper end thereof to actuate the fixing mechanism 60 through spring 62 of the rotor wing as described in my above-mentioned copending application. This movement of shaft 56 and toggle 58 may also be utilized simultaneously to deenergize the reversing motor when the rotor wing is properly oriented.

The rotor wing is thus stopped conveniently by a brake that tends to remain in the "on" position until positively released by the start of the reverse rotation, and is then released, and then also the reversing driving means deenergized when the rotor wing is properly oriented.

With the toggle mechanism of the band brake in the "off" position of Figure 2 and the conversion lever and cam lever 36 in the position of Figure 3, the conversion lever is returned to the rotary wing position, the cam lever 36 will engage the cam roller 34 as the lever is moved towards the left in Figures 2 or 3. To permit this movement the cam lever 36 may be in the form of a bell crank pivoted at its midpoint 64 and urged toward its normally upright position by a spring 66 which will stretch to allow the cam lever 36 to slide by the cam roller 34 in its released position upon the return of the conversion lever.

While there is given above a certain specific example of this invention and its application in practical use, and also a certain modification and alternative, it should be understood that these are not intended to be exhaustive or to be limiting of the invention. On the contrary, this illustration and the explanation herein are given in order to acquaint others skilled in the art with this invention and the principles thereof and a suitable manner of its application in practical use, so that others skilled in the art may be enabled to modify the invention and to adapt and apply it in numerous forms, each as may be best suited to the requirement of a particular use, without departing from the invention.

What is claimed is:

1. In a convertiplane of the type adapted for rotary wing and fixed wing flight having a single lifting surface mounted on a rotatable shaft and adapted for rotary and fixed operation, braking means for stopping the rotation of said lifting surface which comprises a brake drum operatively connected to the rotatable shaft of the lifting surface, a brake member positioned about a portion of said drum and operatively connected to the frame of said convertiplane through at least one spring member, and a self-locking toggle lever assembly mounted so as to tighten said brake member about said drum upon actuation thereof and maintain it in engagement therewith when once applied until released.

2. In a convertiplane of the type having a rotorwing mounted on a shaft and convertible from fixed to rotating operation and vice versa: means for stopping and reversing the rotation of said rotorwing which comprises; a brake drum attached to the shaft of said rotorwing; a brake band surrounding a major portion of said drum; a first spring connected at one end to one end of said brake band and at the other end to the frame of said convertiplane so as to be stressed by the normal rotation of said rotorwing; a yoke pivotally mounted about said rotorwing shaft, a second spring connected between said yoke and the other end of said brake band; a toggle link having one end connected to said yoke, a bell crank pivotally mounted on said frame and carrying at one end thereof a cam roller and connected at the other end to another end of said toggle link, said toggle link and said bell crank forming toggle means being operable into actuated condition to cause said brake band and drum to interengage, said toggle means being once actuated remaining so until positively released; first means to actuate said toggle means; and second cam means mounted on said brake band adjacent said first spring to at least partially release said toggle means upon the stopping of rotation of said rotorwing whereby the release of said toggle means is completed by said second spring as said rotorwing is rotated in reverse direction.

3. In a rotary wing aircraft of the type adapted to be converted from rotary wing to fixed wing flight and vice versa, braking means for stopping and reversing the rotation of said wing including a first brake member, a second brake member mounted in operative relationship therewith, toggle lever means connected to one of said brake members and having first and second operative positions, and when in said first position disengaging said first and second brake members and when in said second position engaging said first and second brake members, means for maintaining said toggle means in said second position during the rotation of said wing, means for at least partially releasing said toggle means from said second position when said wing is stopped, and second release means for completing the release of said toggle means into said first position when said wing starts reverse rotation.

4. In a convertiplane of the type having a rotorwing mounted on a rotatable support convertible from fixed to rotating operation and vice versa, and wherein it is desired in properly orienting the rotor wing when positioning it for fixed operation, to stop the rotation thereof and to reverse it for a short period, band brake means comprising in combination a brake drum fixed to the rotatable support of said rotor wing, a brake band floatingly positioned about said brake drum, a toggle operating mechanism, a fixed pivot for said mechanism and spring means resiliently connecting said brake band with respect to the fixed pivot of said toggle operating mechanism, said toggle operating mechanism being movable about its pivot into condition to permit said brake band to tend to rotate with the rotating brake drum to store energy in said spring means whereby upon the stopping of rotation of said drum, said spring may release its energy to at least partially release said toggle operating mechanism from said condition.

5. A band brake for aircraft of the type wherein the lifting surface is mounted on a rotatable support adapted by positioning of an aircraft operating control for conversion from rotary wing to fixed wing flight and the rotor wing is stopped and reversed in rotation to properly orient it, comprising in combination a brake drum operatively connected to the rotatable support of said rotorwing, a brake band floatingly positioned about said drum, a yoke pivotally mounted about said rotorwing support, a lever mechanism connected between said yoke and the frame of said aircraft, spring means resiliently joining said brake band to said yoke and said frame, to permit said brake band to tend to rotate with said brake drum about said rotorwing support, cam means to actuate said lever mechanism in accordance with the position of said aircraft operating control, and actuating means carried on said brake band positioned to release said lever mechanism upon the partial reverse rotation of said rotorwing.

6. A device as described in claim 5 wherein said lifting surface has an orienting control and said lever mechanism includes a second actuating means which is positioned to actuate the orienting control for the rotor wing of said aircraft.

7. In a rotary wing aircraft of the type adapted to be converted from rotating wing to fixed wing flight and vice versa by driving, stopping, reversing and fixing a rotatable wing, braking means including spring means for stopping and reversing said rotatable wing and including a first brake member coupled to said wing, and including a second brake member mounted upon the frame of the aircraft in operative relationship with said first brake member, toggle lever means actuable into condition for engaging said first and second brake members, said spring means tending to partially release said toggle lever means from said condition when said rotating wing is stopped and to reverse said rotor-wing and a third means operatively connected to said braking means also tending to release said toggle means.

References Cited in the file of this patent

UNITED STATES PATENTS

| | | |
|---|---|---|
| 1,546,313 | Pescara | July 14, 1925 |
| 1,721,450 | Hooper | July 16, 1929 |
| 2,052,937 | Neff | Sept. 1, 1936 |